(No Model.)

H. L. MOULTON.
HUB FRICTION CLUTCH.

No. 495,748. Patented Apr. 18, 1893.

Witnesses:
Hamilton D. Turner
R. Schleicher

Inventor:
Hamilton L. Moulton
by his Attorneys
Howson & Howson

UNITED STATES PATENT OFFICE.

HAMILTON L. MOULTON, OF PHILADELPHIA, PENNSYLVANIA, ASSIGNOR TO THE JAMES SMITH WOOLEN MACHINERY COMPANY, OF SAME PLACE.

HUB FRICTION-CLUTCH.

SPECIFICATION forming part of Letters Patent No. 495,748, dated April 18, 1893.

Application filed January 23, 1893. Serial No. 459,345. (No model.)

*To all whom it may concern:*

Be it known that I, HAMILTON L. MOULTON, a citizen of the United States, and a resident of Philadelphia, Pennsylvania, have invented certain Improvements in Hub Friction-Clutches, of which the following is a specification.

The object of my invention is to so construct a hub friction clutch or coupling as to render the same certain in its action both in clutching and unclutching, and this object I attain in the manner hereinafter set forth, reference being had to the accompanying drawings, in which—

Figure 2:
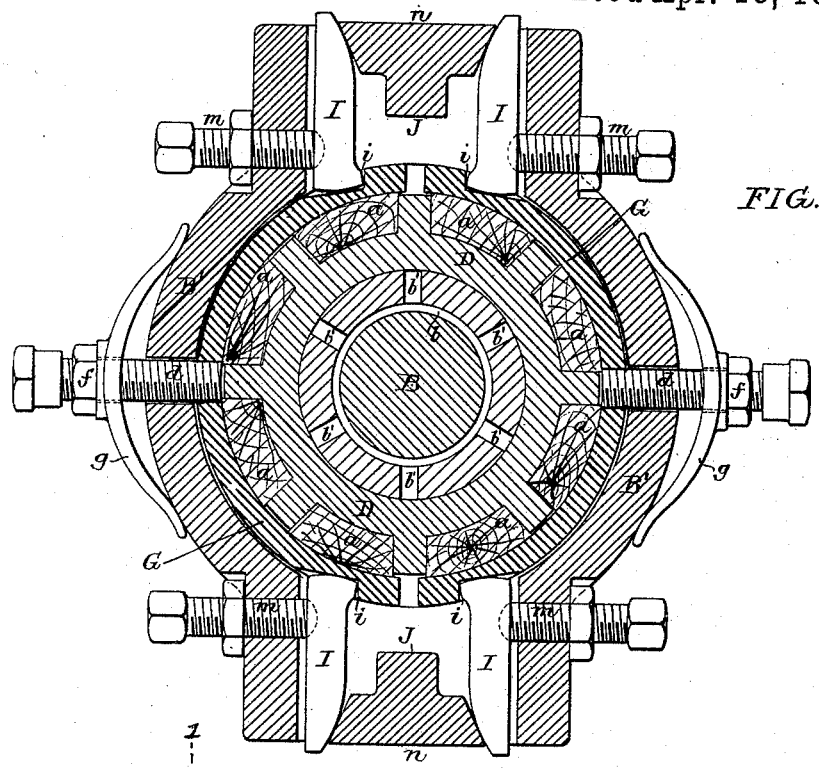
Figure 1:
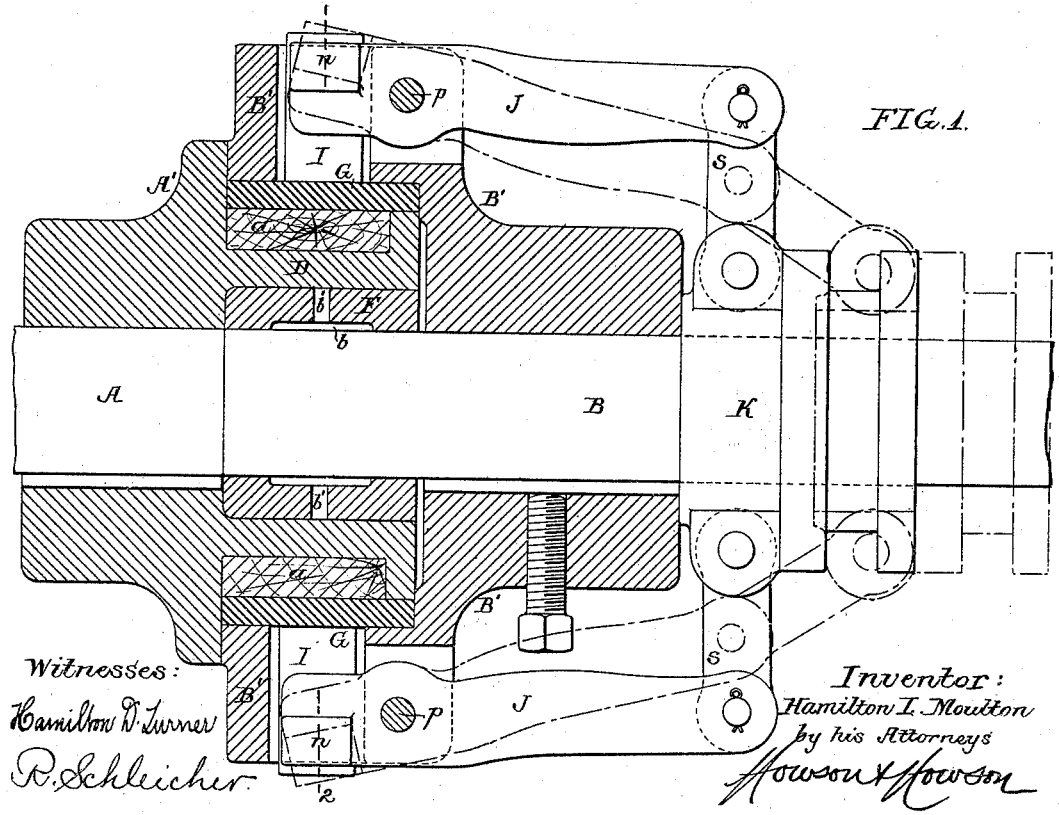

Figure 1, is a longitudinal section, partly in elevation, of a coupling constructed in accordance with my invention. Fig. 2, is a transverse section on the line 1—2, Fig. 1.

In that class of hub friction clutches or couplings upon which my invention is an improvement, the hub is surrounded by a split ring secured to the carrier at a point opposite to the split, the free ends being acted upon by levers under control of a wedge so as to draw them together and tighten the ring upon the hub in order to effect the clutching, the resiliency of the ring being relied upon to free it from frictional driving contact with the hub when the wedge is withdrawn. Some difficulty has been experienced in the use of clutches of this character, especially in unclutching, the ring having a tendency to remain in contact with the hub throughout a portion of its extent so as to cause rapid wear of the engaging parts. Clutches which are released by a spring are, however, preferable in some other respects, to those in which the movement both in clutching and in unclutching is positive. In carrying out my present invention, therefore, I substitute for the former split and elastic ring a pair of semicircular segments each provided with an independent actuating spring and each acted upon at each end by a tightening lever under control of a wedge so that the segments can be firmly clamped upon the hub, or, when released from the action of the wedge, will be drawn apart so as to be entirely free from any driving or wearing contact with said hub.

In the drawings I have shown my invention as applied to a clutch coupling, A and B representing the two shafts which are to be coupled, and A' and B' a pair of disks, the disk A' being keyed to the shaft A, and the disk B' being keyed and bolted to the shaft B, although any desired means for securing either disk to its respective shaft may be adopted. The disk A' has a projecting hub D the periphery of which is recessed for the reception of a series of segmental wooden blocks $a$ which constitute the frictional surface of the hub, the latter being also recessed in the center for the reception of a box F which is mounted upon the end of the shaft B and contains an oil chamber $b$ with passages $b'$ so as to provide for the proper lubrication of the hub when the two shafts are running free, the projection of the shaft B into the hub also serving to insure the proper alignment of the two shafts under all circumstances. The disk B' is recessed for the reception of the hub D and a pair of semicircular segments G embracing the hub, each of these segments being carried by a bolt $d$ which passes through an opening in the disk and has beyond the latter a nut $f$, between which and the outer face of the disk is interposed a spring $g$, a plate spring being shown in the present instance, although a coiled spring may be used if desired. The springs $g$ have a tendency to draw outward the bolts $d$ and the segments G so as to free the latter from contact with the segments $a$ of the hub D, but in each end of each of the segments G is formed a recess $i$, with which engages the short arm of a lever I, mounted upon a fulcrum bolt $m$ carried by the disk B', the long arms of each adjoining pair of levers being acted upon by a wedge $n$ carried by a lever J which is hung to a bolt $p$ extending across a slot in the disk B', the long arms of the pair of levers J being connected by links $s$ to a sliding collar K, which can be moved to and fro on the shaft B by any appropriate mechanism, or, if desired, the outer ends of the levers J may be acted upon by a cone collar or sleeve, or equivalent means for thrusting their outer ends outward and causing an inward movement of the wedges carried by the short arms of the levers. When these wedges are thus thrust inward they force apart the long arms of the levers I and cause the short arms of said levers to pull together the ends of the segments G so as to clamp said segments firmly upon the hub D and thus couple the two shafts together, but as soon as the wedges are withdrawn the springs *g* serve to pull the segments G directly away from the hub and thus prevent any driving or wearing contact between said hub and the segments.

In adapting the invention to a clutch for wheels or pulleys the hub D may be formed upon the loose pulley and the disk B' with its clutching segments and the operating devices therefor may be secured to and rotated with the shaft, or the hub may be formed upon the disk B' and the clutching devices may be carried by the pulley or wheel, as desired.

Having thus described my invention, I claim and desire to secure by Letters Patent—

The combination, in a hub friction clutch or coupling, of the hub, a pair of segments which embrace said hub, bolts upon which said segments are mounted, a carrier through which said bolts pass, springs acting upon said bolts to withdraw the segments from contact with the hub, clamp levers fulcrumed upon the carrier and acting upon the opposite ends of the segments to draw them together, and operating levers also fulcrumed upon the carrier and provided with wedges which act upon said clamp levers, substantially as specified.

In testimony whereof I have signed my name to this specification in the presence of two subscribing witnesses.

HAMILTON L. MOULTON.

Witnesses:
FRANK E. BECHTOLD,
JOSEPH H. KLEIN.